United States Patent
Kojima et al.

(10) Patent No.: US 7,089,407 B2
(45) Date of Patent: Aug. 8, 2006

(54) PACKET PROCESSING DEVICE PROCESSING INPUT PACKET DATA IN A PACKET ROUTING DEVICE

(75) Inventors: Yuji Kojima, Kawasaki (JP); Tetsumei Tsuruoka, Kawasaki (JP); Yasuyuki Umezaki, Fukuoka (JP); Yoshitomo Shimozono, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 348 days.

(21) Appl. No.: 09/792,304

(22) Filed: Feb. 23, 2001

(65) Prior Publication Data

US 2002/0016905 A1 Feb. 7, 2002

(30) Foreign Application Priority Data

Aug. 2, 2000 (JP) ............................. 2000-234075

(51) Int. Cl.
*G06F 9/52* (2006.01)
*G06F 15/82* (2006.01)
(52) U.S. Cl. ........................................ 712/225; 712/25
(58) Field of Classification Search .................... 712/8, 712/11, 25, 225
See application file for complete search history.

(56) References Cited

U.S. PATENT DOCUMENTS

| 4,071,706 | A | * | 1/1978 | Warren | 370/463 |
| 4,128,880 | A | * | 12/1978 | Cray, Jr. | 712/4 |
| 4,710,867 | A | * | 12/1987 | Watanabe | 712/8 |
| 4,760,545 | A | * | 7/1988 | Inagami et al. | 712/4 |
| 5,630,154 | A | * | 5/1997 | Bolstad et al. | 712/19 |
| 6,160,814 | A | * | 12/2000 | Ren et al. | 370/427 |
| 6,401,194 | B1 | * | 6/2002 | Nguyen et al. | 712/210 |

FOREIGN PATENT DOCUMENTS

JP 11317783 11/1999

* cited by examiner

*Primary Examiner*—Daniel H. Pan
(74) *Attorney, Agent, or Firm*—Katten Muchin Rosenman LLP

(57) ABSTRACT

A packet processing device which can reserve a calculation time for each instruction procedure execution unit independent of the data length of a packet by sequentially selecting an instruction procedure execution unit by a selection signal generation unit and performing a calculation on each packet when packets are consecutively input to a packet access unit is disclosed.

14 Claims, 10 Drawing Sheets

FIG. 5

| TYPES OF INSTRUCTIONS | INSTRUCTION MNEMONIC | CONTENTS TO BE EXECUTED |
|---|---|---|
| NON-EXECUTION | NOP | INSTRUCTION IS NOT EXECUTED, ONLY TIME SYNCHRONOUS WITH CLOCK PASSES |
| DATA TRANSFER | MOVE | DATA IS TRANSFERED BETWEEN REGISTERS OR MEMORIES IN A WORD UNIT |
| | MOVW | DATA IS TRANSFERED BETWEEN REGISTERS IN HALF-WORD UNIT (LOWER BIT SIDE) |
| | MOVB | DATA IS TRANSFERED BETWEEN REGISTERS IN A BYTE UNIT (LOWER BIT SIDE) |
| INTEGER OPERATION | ADD | ADD UP INTEGER VALUES IN A WORD UNIT |
| | ADC | ADD UP INTEGER VALUES IN A CARRY AND A WORD UNIT |
| | ADW | ADD UP INTEGER VALUES IN HALF-WORD UNIT |
| | AWC | ADD UP INTEGER VALUES IN A CARRY AND HALF-WORD UNIT |
| | SUB | SUBTRACT INTEGER VALUES IN A WORD UNIT |
| | SBW | SUBTRACT INTEGER VALUES IN HALF-WORD UNIT |
| LOGIC OPERATION | OR | TAKE LOGICAL SUM IN A WORD UNIT |
| | AND | TAKE LOGICAL PRODUCT IN A WORD UNIT |
| | XOR | TAKE EXCLUSIVE OR IN A WORD UNIT |
| | NOT | INVERT IN A WORD UNIT |
| | NTW | INVERT IN HALF-WORD UNIT, AND NOT INVERT UPPER BIT IN AND ABOVE HALF-WORD UNIT |
| | NTB | INVERT IN A BYTE UNIT, AND NOT INVERT UPPER BIT IN AND ABOVE A BYTE UNIT |
| | SFL | SHIFT TO LEFT (UPPER BIT SIDE), AND FILL LOWER BIT WITH 0 |
| | ROTL | ROTATE TO LEFT |
| | SFR | SHIFT TO RIGHT (LOWER BIT SIDE), AND FILL UPPER BIT WITH 0 |
| | ROTR | ROTATE TO RIGHT |
| BIT OPERATION | BSF | RETRIEVE BIT STRING OF SOURCE OPERAND FROM LOWEST BIT, OBTAIN FIRST BIT POSITION HAVING VALUE 1 |
| | BSR | RETRIEVE BIT STRING OF SOURCE OPERAND FROM HIGHEST BIT, OBTAIN FIRST BIT POSITION HAVING VALUE 1 |
| | BT | SET BIT VALUE HAVING SOURCE OPERAND 1 AS BASE AND SOURCE OPERAND 2 AS OFFSET TO CARRY FLAG OF FLAG REGISTER |

FIG. 6

| SERIAL NUMBER | INSTRUCTION PROCEDURE OF ARITHMETIC UNIT 141 | | INSTRUCTION PROCEDURE OF ARITHMETIC UNIT 151 | | INSTRUCTION PROCEDURE OF ARITHMETIC UNIT 161 | |
|---|---|---|---|---|---|---|
| | ORDER | INSTRUCTIONS | ORDER | INSTRUCTIONS | ORDER | INSTRUCTIONS |
| 1 | 1 | AMOVE r0 p7 | | | | |
| 2 | 2 | AADD r0 r0 p7 | | | | |
| 3 | 3 | AADC r0 r0 p7 | | | | |
| 4 | 4 | AADC r0 r0 p7 | | | | |
| 5 | 5 | AADC r0 r0 p7 | | | | |
| 6 | 6 | AADC r0 r0 $0 | | | | |
| 7 | 7 | AMOVE r1 r0 | | | | |
| 8 | 8 | ASFR r0 r0 $16 | | | | |
| 9 | 9 | AADW r0 r0 r1 | | | | |
| 10 | 10 | ANTW r0 r0 | | | | |
| 11 | 11 | ≠MOVE e13 $1 | 1 | AMOVE r0 p7 | | |
| 12 | | | 2 | AADD r0 r0 p7 | | |
| 13 | | | 3 | AADC r0 r0 p7 | | |
| 14 | | | 4 | AADC r0 r0 p7 | | |
| 15 | | | 5 | AADC r0 r0 p7 | | |
| 16 | | | 6 | AADC r0 r0 $0 | | |
| 17 | | | 7 | AMOVE r1 r0 | | |
| 18 | | | 8 | ASFR r0 r0 $16 | | |
| 19 | | | 9 | AADW r0 r0 r1 | | |
| 20 | | | 10 | ANTW r0 r0 | | |
| 21 | | | 11 | ≠MOVE e13 $1 | 1 | AMOVE r0 p7 |
| 22 | | | | | 2 | AADD r0 r0 p7 |
| 23 | | | | | 3 | AADC r0 r0 p7 |
| 24 | | | | | 4 | AADC r0 r0 p7 |
| 25 | | | | | 5 | AADC r0 r0 p7 |
| 26 | | | | | 6 | AADC r0 r0 $0 |
| 27 | | | | | 7 | AMOVE r1 r0 |
| 28 | | | | | 8 | ASFR r0 r0 $16 |
| 29 | | | | | 9 | AADW r0 r0 r1 |
| 30 | | | | | 10 | ANTW r0 r0 |
| 31 | | | | | 11 | ≠MOVE e13 $1 |

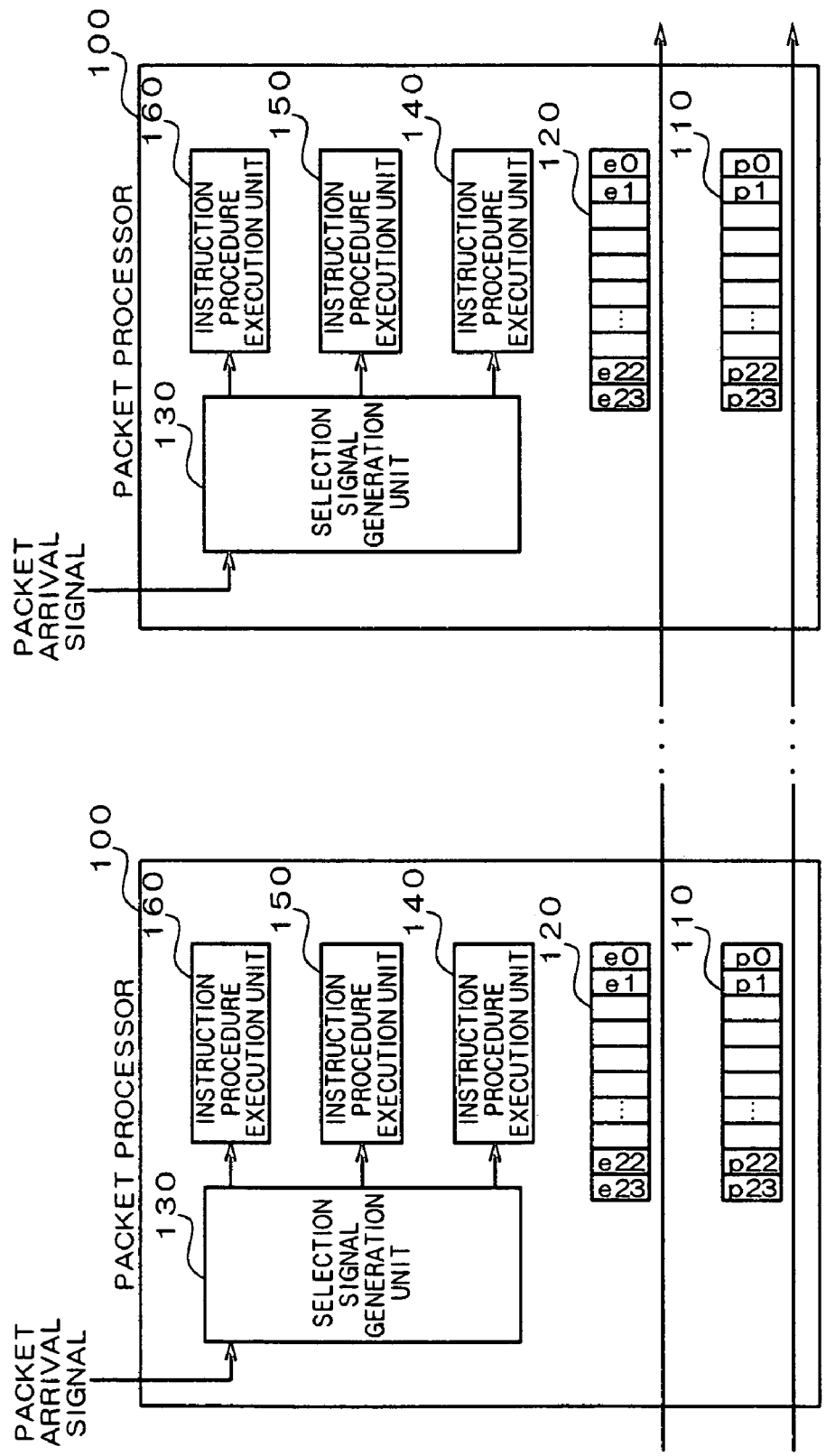

PACKET PROCESSING DEVICE PROCESSING INPUT PACKET DATA IN A PACKET ROUTING DEVICE

BACKGROUND OF THE INVENTION

The present invention relates to a packet processing device for performing a predetermined packet process on input packet data in a packet routing device, etc.

Conventionally, communications have been established among terminals interconnected through a network. In view of the growing scale of networks, it has been required to route networks to other networks. For example, a network is set with a LAN (Local Area Network) connected with another LAN, or a LAN connected with a dedicated line. Specifically, a network using an IP (Internet Protocol) has been a leader in this technology. An IP is a connectionless type protocol corresponding to a network layer in an OSI (Open System Interconnection) model of ISO (International Organization for Standardization). In the connectionless type IP communications, unlike the connection type protocol used in reserving in advance a communications path between terminals, a packet routing device for interconnecting LANs realizes the communications among the terminals by performing a routing process on the packets containing communications data. In the routing process in the IP network, it is necessary to perform various packet processes such as a destination table searching process, a header rewriting process, etc.

In the packet process performed in the above mentioned packet routing device, a process of filtering a packet to limit the communications in a network is included in addition to various processes required to route packets such as a process of computing a checksum of a packet header, a process of searching a destination table, a process of rewriting a packet header, etc. These processes are too complicated to be performed using dedicated hardware, and have conventionally been realized in software processes.

FIG. 10 shows the configuration of the conventional packet processing device for performing a packet process using a processor. As shown in FIG. 10, a processor 900 is connected to memory 910 through a bus 920 in the conventional packet processing device. With the configuration, various packet processes are performed in the packet routing device by the processor 900 reading a packet stored in the memory 910.

In the conventional packet processing device using the above mentioned processor 900, packet data has frequently been read and written in the memory 910, it has been difficult to quickly perform the packet process. That is, after the processor 900 stores packet data in the memory 910, the stored packet data is appropriately read, a predetermined process is performed on the read contents, and the process result has to be written to the memory 910. In addition, the processor 900 reads packet data after providing a read address for the memory 910. Similarly, the processor 900 writes packet data after providing a write address for the memory 910. At this time, it takes a longer time to allow data to be read or written after the processor 900 provides an address for the memory 910 than the cycle time of the processor 900.

Furthermore, the consecutive sequence processor 900 can process only one process at a time, and cannot simultaneously perform reading and writing operations. Additionally, it is hard to generate a circuit capable of simultaneously performing reading and writing operations. As a result, the processor 900 cannot simultaneously read and write packet data using the memory 910.

Thus, overhead in reading and writing packet data using the memory 910 is the problem in the process of transferring packet data between the processor 900 and the memory 910, thereby interfering with a high-speed packet process.

In addition, in the conventional packet processing device including the above mentioned processor 900, the processing time allowed for one packet depends on the intervals of consecutively receiving two packets. Therefore, the processing time allowed for the shortest data length of a packet is shortened, thereby causing the problem that the number of steps of executable instruction procedure is smaller. By storing packet data waiting for a process in the memory 910, the processing time can be adjusted when a packet having a short data length is temporarily received, but the memory 910 overflows when a large number of packets having short data lengths are consecutively received, and the number of unprocessed packet data gradually increases. Therefore, a packet processing device is desired which can execute a large number of instruction procedures independently of the type or the data length of a packet if any kind of packet is transferred or received.

SUMMARY OF THE INVENTION

The present invention has been developed to solve the above mentioned problems, and aims at providing a packet processing device capable of performing a high-speed packet process in a large number of instruction procedures independent of the data length of a packet.

The packet processing device according to the present invention includes a packet processor for performing a predetermined packet process by executing an instruction. The packet processor includes a packet access unit, a plurality of instruction procedure execution units, and a selection signal generation unit. The packet access unit includes a plurality of first registers, shifts received packet data among the first registers sequentially from the start, and then transmits the shifted data. Each of the plurality of instruction procedure execution units executes predetermined calculation in parallel corresponding to a plurality of packets according to the packet data held in the first register in the packet access unit. The selection signal generation unit generates a selection signal for selection of the instruction procedure execution unit for performing calculation corresponding to a packet in synchronization of a packet receiving timing. When packets are consecutively input, the instruction procedure execution units for performing calculation on each packet are sequentially selected for a parallel process. Therefore, although a packet having a short data length is received, the time for calculation of each instruction procedure execution unit can be reserved independent of the data length of a packet, thereby performing a larger number of instruction procedures. Additionally, the packet access unit holds and transfers packet data, and packet data to be processed in a calculation process is read and written between each of the instruction procedure execution units and the first register in the packet access unit. Therefore, the overhead for the reading and writing operations of the packet data performed between a processor and memory, which has been the problem with the conventional packet processing device, can be reduced. As a result, a calculation process including packet data reading and writing operations can be performed at a higher speed.

In addition, it is desirable that the packet processor further includes an intermediate data transfer unit for shifting, and then transferring, intermediate data, which is a process result from the instruction procedure execution unit, between a plurality of second registers in synchronization with the operation of shifting the packet data in the packet access unit. When it is necessary to hold the intermediate data generated during a calculation process, or finally and externally output the data, then the overhead for reading the intermediate data after the intermediate data is written to the memory can be reduced, thereby performing the calculation process at a higher speed including a series of operations relating to the intermediate data.

In addition, it is desirable that the above mentioned packet access unit includes: a first selector for selectively retrieving the packet data held in the plurality of first registers and inputting it to the instruction procedure execution unit; and a second selector for inputting resultant data obtained when a specific instruction procedure is executed by the instruction procedure execution unit to the first register corresponding in the execution order of the instruction procedure. By providing the first and the second selectors, the packet data sequentially shifted among the plurality of first registers can be read as necessary and input to each instruction procedure execution unit, or the data output from each instruction procedure execution unit can be written to any of the first registers, thereby efficiently inputting and outputting packet data between each instruction procedure execution unit and the packet access unit.

It is also desirable that the above mentioned intermediate data transfer unit further includes: a third selector for selectively retrieving the intermediate data held in the plurality of second registers and inputting it to the instruction procedure execution unit; and a fourth selector for inputting intermediate data obtained when a specific instruction procedure is executed by the instruction procedure execution unit to the second register corresponding in the execution order of the instruction procedure. By providing the third and the fourth selectors, the intermediate data sequentially shifted among the plurality of second registers can be read as necessary and input to each instruction procedure execution unit, or the intermediate data output from each instruction procedure execution unit can be written to any of the second registers, thereby efficiently inputting and outputting intermediate data between each instruction procedure execution unit and the intermediate data transfer unit.

Each of the above mentioned instruction procedure execution units includes: a control unit for sequentially decoding a plurality of instruction procedures; an arithmetic unit for performing a predetermined calculation process corresponding to the decoding process result obtained by the control unit; and a general purpose register group containing a plurality of general purpose registers which function as a work area of the arithmetic unit. It is desirable that the number of instruction procedures prepared for a process for one packet can be set as the number corresponding to the time longer than the minimum reception interval of two packets. Since the calculation processes are performed in parallel by a plurality of instruction procedure execution units, a calculation process can be started on one packet before a calculation process is completely performed on the previous packet. As a result, the number of instruction procedures to be processed by each of the instruction procedure execution units can be set as a value corresponding the time longer than the minimum reception intervals of two packets, thereby practically realizing complicated packet processes.

It is also desirable that at least one of the above mentioned first and second registers includes a write location setting unit for variably setting the location at which externally input data is written. When a calculation process can be performed in a small number of instruction procedures, the time required from input to output of various data to and from the packet access unit and the intermediate data transfer unit can be shortened by inputting packet data and intermediate data to the registers of the intermediate stages of the packet access unit and the intermediate data transfer unit.

It is also desirable that at least one of the above mentioned first and second registers includes a read location setting unit for variably setting the location at which externally output data is read. When a calculation process can be performed in a small number of instruction procedures, the time required from input to output of various data to and from the packet access unit and the intermediate data transfer unit can be shortened by fetching packet data and intermediate data from the registers of the intermediate stages of the packet access unit and the intermediate data transfer unit.

It is furthermore desirable that a packet processing device can be configured by connecting a plurality of packet processors in series. If a large number of instruction procedure execution units are provided in one packet processor, the wiring becomes complicated among each instruction procedure execution unit, packet access unit, and intermediate data transfer unit, and the delay time of signals is undesirably prolonged. On the other hand, a plurality of packet processors having a plurality of instruction procedure execution units can be connected in series to perform a packet process having a number of instruction procedures on a single packet without prolonging the delay time.

BRIEF DESCRIPTION OF THE DRAWINGS

FIG. 5 shows a practical example of an instruction input to the control unit in each instruction procedure execution unit;

FIG. 6 shows a series of instruction procedures configured using an instruction set shown in FIG. 5;

FIG. 7 shows a schematic configuration of the packet processing device according to a second embodiment;

DESCRIPTION OF THE PREFERRED EMBODIMENT

Figure 1:
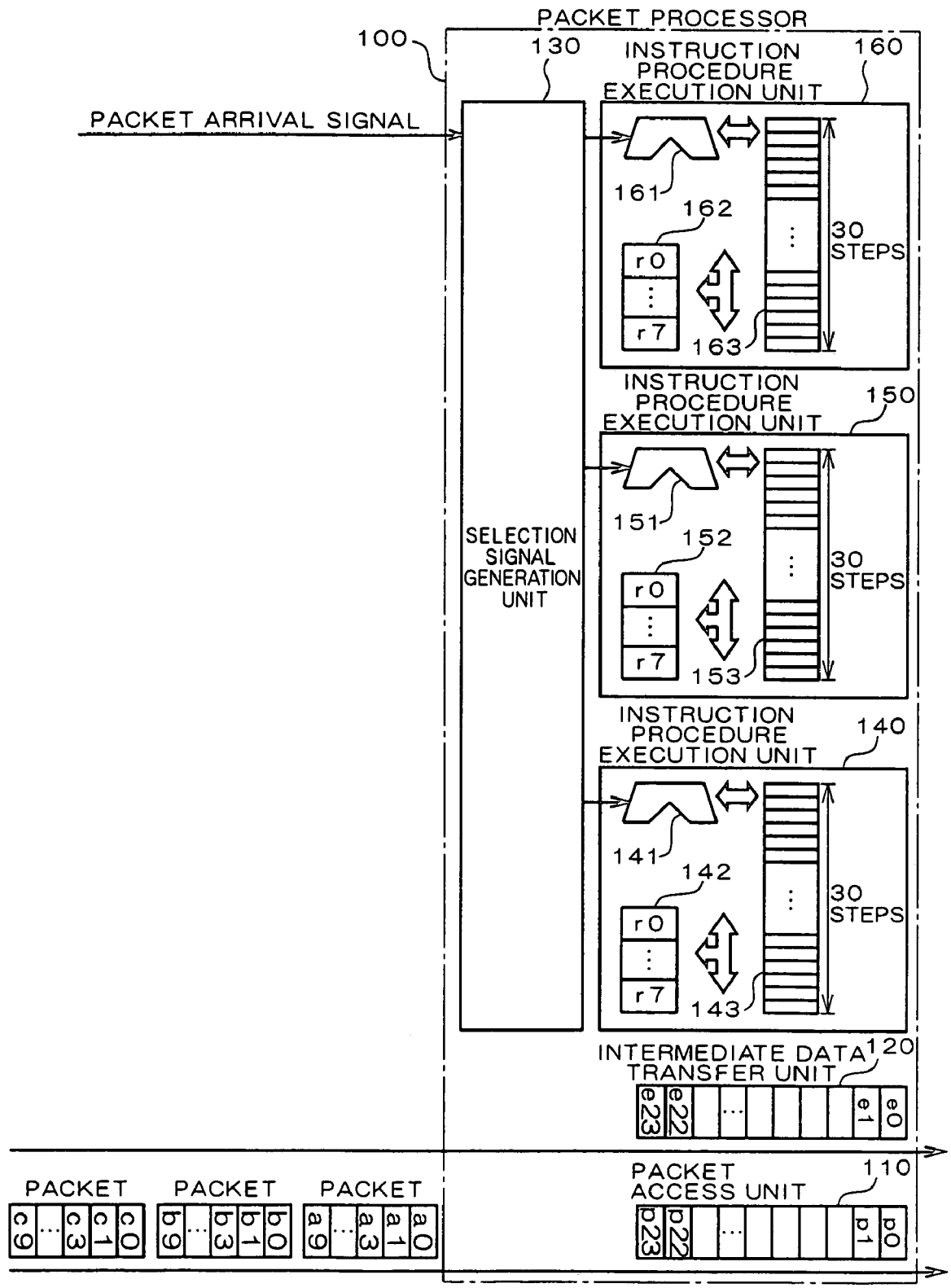
FIG. 1 shows a schematic configuration of a packet processor according to a first embodiment.

FIG. 1 shows a schematic configuration of the packet processor according to a first embodiment of the present invention. As shown in FIG. 1, a packet processor 100 according to this embodiment includes a packet access unit 110, an intermediate data transfer unit 120, a selection signal generation unit 130, a plurality of (three, for example) instruction procedure execution units 140, 150, and 160.

The packet access unit 110 fetches and holds externally input packet data, and is used to read part of the held packet data and write part of the data. To attain this, the packet access unit 110 includes a plurality of (24, for example) registers p0 through p23 connected in series. The externally input packet data is sequentially fetched in each of the registers p0 through p23 in predetermined bits units from the beginning, and is then transferred. For example, assuming that the number of bits of the one word data held in each of the registers p0 through p23 is 32, the externally input packet data is fetched and held in the register p23 at the first stage in 32 bit units. Each of the registers p22 to p0 at and after the second stage sequentially shifts and holds the partial packet data fetched and held by the register p23 at the first stage. During the shifting operation, the packet data is read from each of the instruction procedure execution units 140, 150, and 160, and the data output from each of the instruction procedure execution units 140, 150, and 160 is replaced with the partial packet data being transferred. Then, the packet data on which a predetermined packet process has been completed by the packet processor 100 is output from the register p0 at the last (24th) stage.

The intermediate data transfer unit 120 is used to hold and transfer various process results relating to packet data, and includes a plurality of (24, for example) registers e0 through e23 connected in series. The number of the registers is set to match the number of the registers p0 through p23 contained in the packet access unit 110. For example, when various process results relating to packet data are externally input and held in the register e23 at the first stage, each of the registers e22 to e0 at and after the second stage sequentially shifts and holds the process results fetched and held in the register e23 at the first stage. During the shifting operation, the process results are read by each of the instruction procedure execution units 140, 150, and 160, and new process results are output from each of the instruction procedure execution units 140, 150, and 160, and written to any of the registers.

When a packet arrival signal is externally input, the selection signal generation unit 130 outputs an individual selection signal indicating the start of an instruction procedure executing operation to any of the three instruction procedure execution units 140, 150, and 160. For example, when the first packet arrival signal is input, the selection signal generation unit 130 outputs an individual selection signal to the instruction procedure execution unit 140. When the second packet arrival signal is input, it outputs an individual selection signal to the instruction procedure execution unit 150. When the third packet arrival signal is input, it outputs an individual selection signal to the instruction procedure execution unit 160. After the individual selection signals are sequentially input to these instruction procedure execution units 140, 150, and 160, and when the fourth packet arrival signal is input, the selection signal generation unit 130 inputs the individual selection signal again to the instruction procedure execution unit 140. Thus, the operations of inputting the individual selection signal to the three instruction procedure execution units 140, 150, and 160 are cyclically performed in a predetermined order.

The instruction procedure execution unit 140 performs a predetermined packet process on the packet data input to the packet access unit 110 in synchronization with the input timing of the individual selection signal. To attain this, the instruction procedure execution unit 140 includes an arithmetic unit 141, a general-purpose register group 142, and an instruction procedure storage unit 143. The arithmetic unit 141 performs a predetermined calculation operation by sequentially reading and executing a plurality of instructions stored in the instruction procedure storage unit 143. The general-purpose register group 142 includes a plurality of (8, for example) general-purpose registers r0 through r7. Each of these general-purpose registers is used as the work areas of the arithmetic unit 141 as necessary. The instruction procedure storage unit 143 stores a series of instructions executed by the arithmetic unit 141. For example, the instructions in 30 steps are stored therein.

Similarly, the instruction procedure execution unit 150 comprises an arithmetic unit 151, a general-purpose register group 152, and an instruction procedure storage unit 153. The instruction procedure execution unit 160 comprises an arithmetic unit 161, a general-purpose register group 162, and an instruction procedure storage unit 163. These instruction procedure execution units 150 and 160 have the same configurations as the above mentioned instruction procedure execution unit 140, but the detailed explanation is omitted here.

Figure 2:
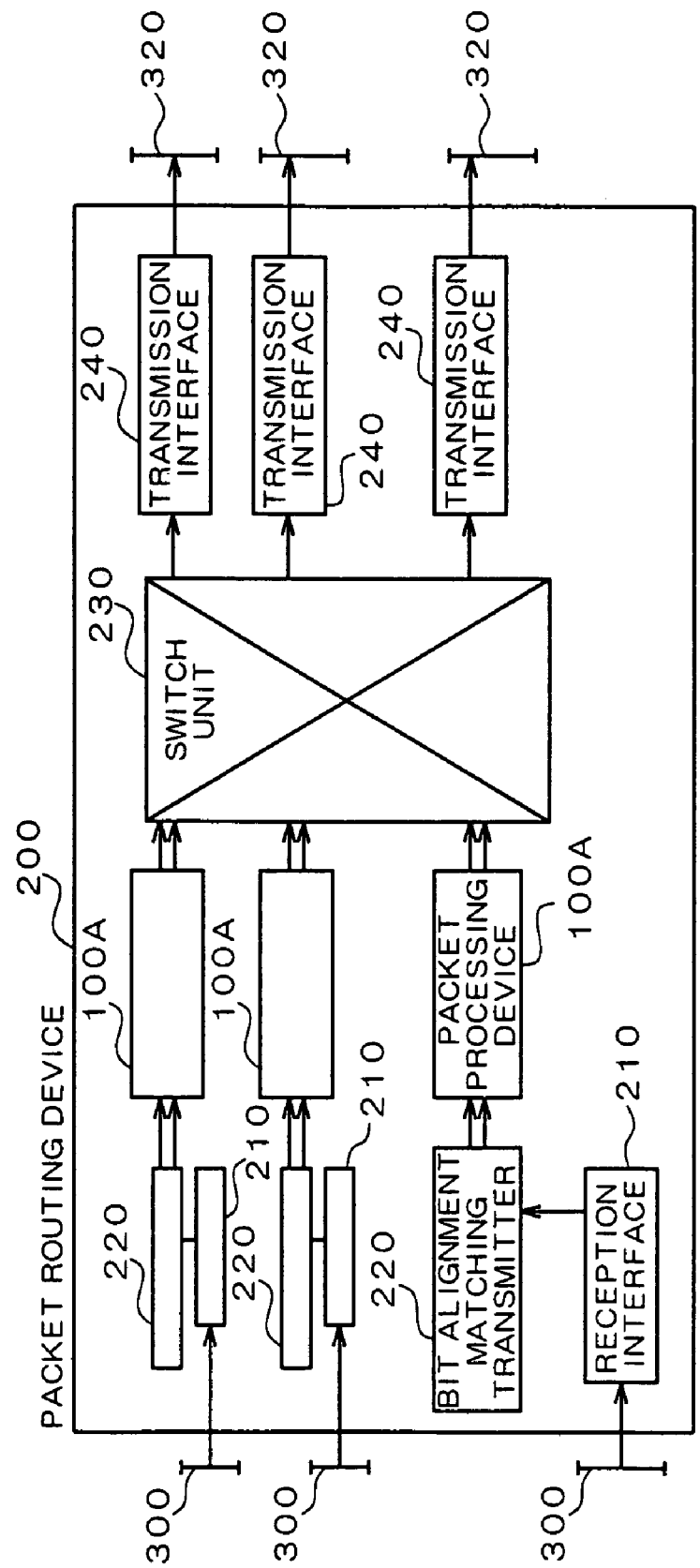
FIG. 2 shows the configuration of the packet routing device including the packet processor shown in FIG. 1.

FIG. 2 shows the configuration of the packet routing device including the packet processor shown in FIG. 1. A packet routing device 200 shown in FIG. 2 comprises a packet processing device 100A provided corresponding to each of a plurality of LANs 300, a reception interface 210, a bit alignment matching transmitter 220, a switch unit 230 for performing a predetermined routing process according to the destination address in a packet header, and a plurality of transmission interfaces 240 for transmitting a packet output from the switch unit 230 to any corresponding LAN 320.

The reception interface 210 is used to connect the packet routing device 200 to the LAN 300, and receives a packet transmitted through the LAN 300. The bit alignment matching transmitter 220 divides a packet received by the reception interface 210 in predetermined bit units from the beginning to generate packet data in a word unit which is a process unit in the packet routing device 200. The packet data obtained in the dividing process in the predetermined bit units is input to the packet processing device 100A. For example, according to this embodiment, a process is performed using 32 bits as one word in the packet routing device 200, and the bit alignment matching transmitter 220 divides the input packet data in 32 bit units. When a new packet received by the reception interface 210 is input, the bit alignment matching transmitter 220 outputs a predetermined packet arrival signal indicating the arrival of a packet to the packet processing device 100A.

The packet processing device 10A performs a predetermined packet process according to the packet data output from the bit alignment matching transmitter 220. According to this embodiment, the packet processing device 100A comprises the packet processor 100 shown in FIG. 1.

In the packet processor 100 constituting the packet processing device 100A, when a packet arrival signal is input from the bit alignment matching transmitter 220, the selection signal generation unit 130 cyclically outputs an individual selection signal to any of the three instruction procedure execution units 140, 150, and 160. The instruction procedure execution units 140, 150, and 160 which have received the individual selection signal performs various packet processes such as computing a checksum, searching a destination table, rewriting a packet header, etc. on the packet data of each received packet output from the bit alignment matching transmitter 220, and then outputs the packet to the switch unit 230 after the various packet processes.

Figure 3:
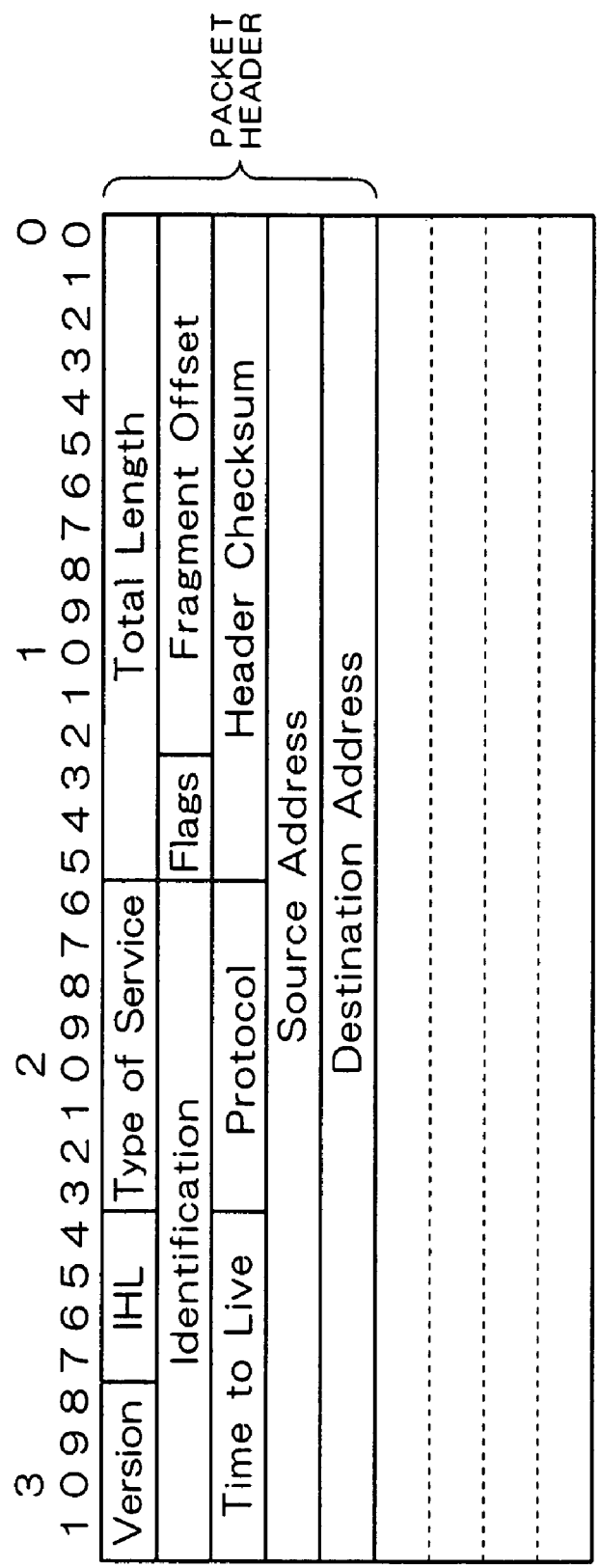
FIG. 3 shows the format of the packet corresponding to the IPv4.

FIG. 3 shows the format of the packet corresponding to the Ipv4 (version 4). As shown in FIG. 3, the packet header corresponding the Ipv4 contains Version, IHL (Internet Header Length), Type of Service, Total Length, Identification, Flags, Fragment Offset, Time to Live, Protocol, Header checksum, Source Address, and Destination Address.

As described above, various data is contained to route a packet at a specified location of a packet header, and the packet processor 100 can read specific data required to perform various packet processes or rewrite specific data by sequentially fetching and holding the entire packet data including the packet header in the registers P23 to P0 of the packet access unit 110 from the beginning in predetermined bit units. FIG. 3 shows the case in which 4-word communications data is stored in the data area preceded by the packet header. According to this embodiment, it is assumed that the packet data containing a 5-word packet header and a 4-word communications data, that is, a total of 9-word packet data, correspond to the packet of the smallest size.

Thus, the packet processor 100 selectively and cyclically inputs an individual selection signal from the selection signal generation unit 130 to the instruction procedure execution units 140, 150, and 160 each time a packet is received and a packet arrival signal is output from the bit alignment matching transmitter 220, and any of the instruction procedure execution units 140, 150, and 160 starts performing a packet process. Therefore, each of the instruction procedure execution units only has to finish the packet process corresponding one packet by the time when the third packet from the current packet arrives, thereby setting a larger number of steps of a packet process permitted for one packet.

For example, assuming that the number of instruction procedures executable at the minimum packet interval (shortest reception intervals) when packets of the smallest size shown in FIG. 3 are consecutively received is n, the packet processor 100 according to this embodiment can assume that the number of instruction procedures allowable for one packet in each of the instruction procedure execution units 140, 150, and 160 is 3n. Therefore, the packet processor 100 can perform a packet process having instruction procedures of the number independent of the size (data length of a packet) of a received packet.

Described below is a practical example of the detailed configuration and operations of the packet processor 100 according to this embodiment.

Figure 4:
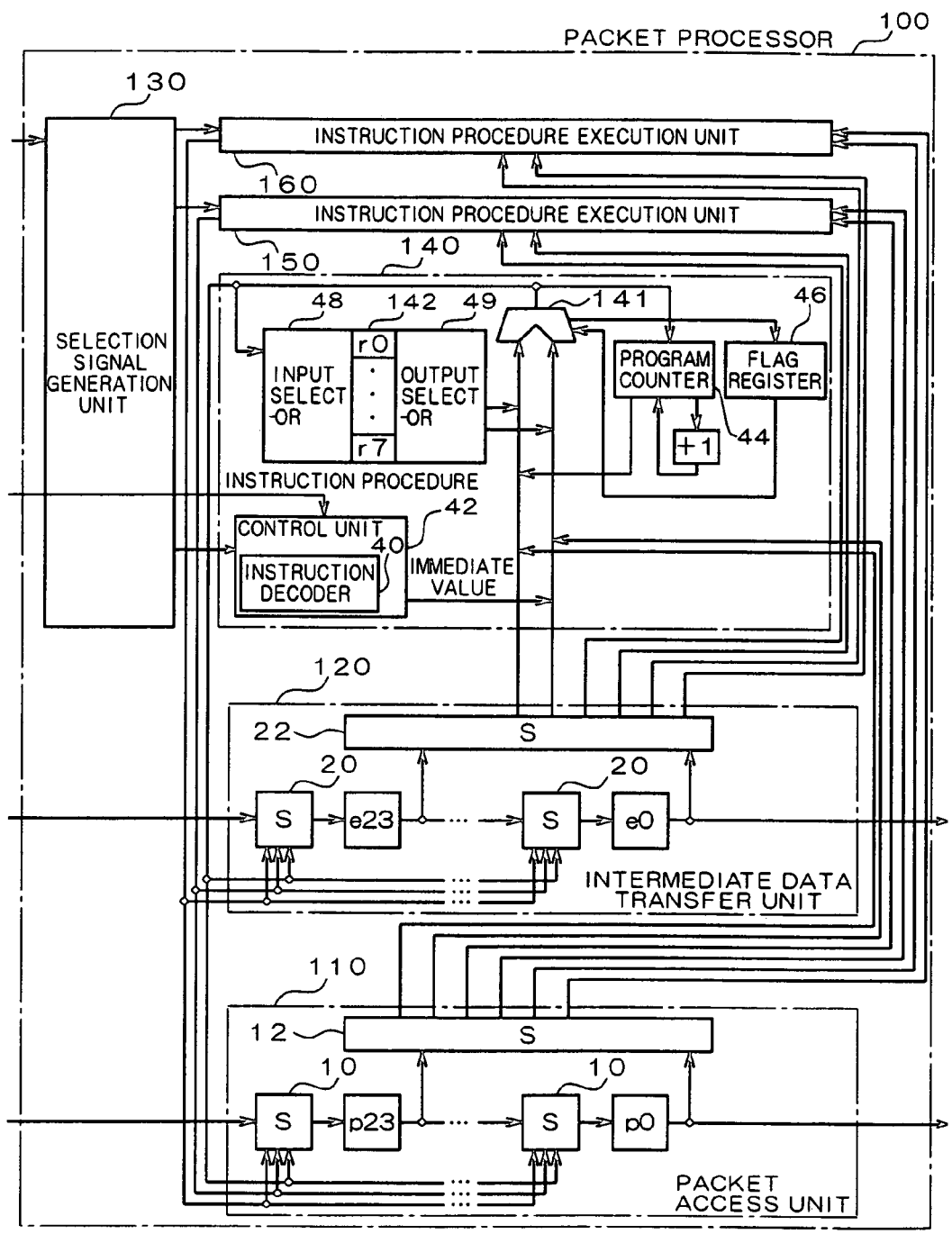
FIG. 4 shows the detailed configuration of the packet processor according to this embodiment.

FIG. 4 shows the detailed configuration of the packet processor 100. As shown in FIG. 4, the packet access unit 110 comprises, in addition to the above mentioned 24 registers p0 through p23 sequentially holding packet data in a word unit (32 bit unit), 24 selectors (S) 10 provided before the respective registers p0 through p23, and a selector (S) 12 for selecting output data of the registers p0 through p23.

The selector 10 at the first stage provided before the register p23 receives the 32-bit packet data input to the packet access unit 110, and the three pieces of resultant data obtained when a predetermined instruction procedure is performed by each of the three instruction procedure execution units 140, 150, and 160, selects any of the four pieces of data, and outputs the selected data to the register p23. The register p23 fetches and holds the data output from the selector 10 at the previous stage in synchronization with the next rise of the clock signal.

The selector 10 at the second stage provided between the register p22 and the register p23 receives the data output from the register p23, and the three pieces of resultant data obtained when a predetermined instruction procedure is performed by each of the three instruction procedure execution units 140, 150, and 160, selects any of the four pieces of data, and outputs it to the register p22. The register p22 fetches and holds the data output from the selector 10 at the previous stage in synchronization with the next rise of the clock signal.

Similarly, the each of the selectors 10 at and after the third stage receives the data output from the register connected at the previous stage, and the three pieces of resultant data obtained when a predetermined instruction procedure is performed by each of the three instruction procedure execution units 140, 150, and 160, selects any of the four pieces of data, and outputs it to the register at the subsequent stage. The register at the subsequent stage fetches and holds the data output from the selector 10 at the previous stage in synchronization with the next rise of the clock signal.

Furthermore, the selector 12 connected commonly on the output side of the 24 registers p0 through p23 receives the data output from each of the registers p0 through p23, selects at most 2 pieces of data, and outputs it to the instruction procedure execution units 140, 150, and 160.

As shown in FIG. 4, the intermediate data transfer unit 120 comprises, in addition to the above mentioned 24 registers e0 through e23 holding intermediate data, 24 selectors (S) 20 provided before the respective registers e0 through e23, and a selector (S) 22 for selecting output data of the registers e0 through e23. The intermediate data transfer unit 120 basically has the same configuration as the above mentioned packet access unit 110.

That is, the selector 20 at the first stage provided before the register e23 receives the intermediate data input to the intermediate data transfer unit 120, and the three intermediate data obtained when a predetermined instruction procedure is performed by each of the three instruction procedure execution units 140, 150, and 160, selects any of the four pieces of intermediate data, and outputs the selected data to the register e23. The register e23 fetches and holds the data output from the selector 20 at the previous stage in synchronization with the next rise of the clock signal.

The selector 20 at the second stage provided between the register e22 and the register e23 receives the intermediate data output from the register e23, and the three pieces of intermediate data obtained when a predetermined instruction procedure is performed by each of the three instruction procedure execution units 140, 150, and 160, selects any of the four pieces of intermediate data, and outputs it to the register e22. The register e22 fetches and holds the data output from the selector 20 at the previous stage in synchronization with the next rise of the clock signal.

Similarly, the each of the selectors 20 at and after the third stage receives the intermediate data output from the register connected at the previous stage, and the three pieces of intermediate data obtained when a predetermined instruction procedure is performed by each of the three instruction procedure execution units 140, 150, and 160, selects any of the four pieces of intermediate data, and outputs it to the register at the subsequent stage. The register at the subsequent stage fetches and holds the intermediate data output from the selector 20 at the previous stage in synchronization with the next rise of the clock signal.

Furthermore, the selector 22 connected commonly on the output side of the 24 registers e0 through e23 receives the intermediate data output from each of the registers e0 through e23, selects at most 2 pieces of data, and outputs the data to the instruction procedure execution units 140, 150, and 160.

According to this embodiment, the number of the registers p0 through p23 contained in the packet access unit 110 matches the number of the registers e0 through e23 contained in the intermediate data transfer unit 120, and each of the registers is set to fetch data in synchronization with the same clock signal. Therefore, when a predetermined packet process is performed with the packet data sequentially shifted between registers in the packet access unit 110, the intermediate data generated in the packet process is also sequentially shifted in the intermediate data transfer unit 120 in synchronization with this packet process.

As shown in FIG. 4, to perform a predetermined packet process on the packet data input to the packet access unit 110, the instruction procedure execution unit 140 comprises, in addition to the arithmetic unit 141, and the general-purpose register group 142, a control unit 42 including an instruction decoder 40 for decoding each instruction procedure in an input order; a program counter 44 for counting the number of process steps of the arithmetic unit 141; and a flag register 46 for holding each status of a calculation result by the arithmetic unit 141. In addition, the general-purpose register group 142 comprises: an input selector 48 for switching a general-purpose register to which data is to be input in the eight general-purpose registers r0 through r7; and an output selector 49 for switching a general-purpose register from which data is to be read.

The instruction decoder 40 in the control unit 42 sequentially decodes a series of instruction procedures input in synchronization with a clock signal. Based on the process result, the control unit 42 issues operation instructions as necessary to other components of the instruction procedure execution unit 140, the selectors 10 and 12 in the packet access unit 110, or the selectors 20 and 22 in the intermediate data transfer unit 120.

In FIG. 4, the necessary control lines for these operation instructions are omitted, and only the data lines among the components are displayed. For example, assume that when an instruction procedure is performed, the data stored in the general-purpose register r0 and the data stored in the register p23 are added up, and the result is stored in the general-purpose register r0. When the instruction procedure is decoded by the instruction decoder 40, the control unit 42 first controls the output selector 49 to output the data in the general-purpose register r0 to one input terminal of the arithmetic unit 141, and then controls the selector 12 in the packet access unit 110 to output the data in the register p23 to another input terminal of the arithmetic unit 141. Then, the control unit 42 controls the arithmetic unit 141 to add up the data input to the two input terminals, controls the input selector 48 and the general-purpose register r0, and stores the addition result in the general-purpose register r0.

In the configuration example shown in FIG. 1, a series of instruction procedures are stored in the instruction procedure storage unit 143 in the instruction procedure execution unit 140. There can be variations of methods of holding these instruction procedures. For example, memory (not shown in the attached drawings) is externally provided for the instruction procedure execution unit 140 or the packet processor 100 so that these instruction procedures can be sequentially read before performing the packet process.

In addition, in FIG. 4, other two instruction procedure execution units 150 and 160 have basically the same configuration as the above mentioned instruction procedure execution unit 140, and the operations performed when the same instruction procedure is input are the same as the corresponding operations of the instruction procedure execution unit 140. Therefore, the same process result can be obtained when a packet process is performed by any of the instruction procedure execution units 140, 150, and 160 on an input packet data.

FIG. 5 shows a practical example of an instruction input to the control unit 42 in the instruction procedure execution units 140, 150, and 160. FIG. 6 shows a series of instruction procedures configured using an instruction set (types of instructions) shown in FIG. 5, and shows, as an example, a program executed when a checksum of a packet header is computed.

As shown in these figures, the types of the instructions executed by the packet processor 100 according to this embodiment are classified into non-execution, data transfer, integer operation, logic operation, and bit operation instructions.

According to this embodiment, as shown in FIG. 6, with respect to the instruction format used when each instruction is described, there is an expression rule for each instruction procedure, that is, an instruction mnemonic represented by 'MOVE', etc. is always preceded by a condition code. The packet processor 100 executes the instruction described after the condition code when the calculation result of the previous instruction satisfies the condition expressed by the condition code. For example, when the calculation result of the previous instruction executed by the packet processor 100 is 0, the packet processor 100 executes this instruction if the condition code of the instruction to be executed is '=' (equal to 0). If other condition codes are assigned, the instruction is not executed, and only the time synchronous with the clock passes. As condition codes other than the '=', for example, '‡' (not equal to 0), '<' (smaller than 0), '>' (larger than 0), 'A' (to always execute), etc. can be used. Each of the instruction procedure execution units 140, 150, and 160 has as the flag register 46 a number of evaluation flags required to evaluate (determine whether or not each condition code is satisfied) the truth and false of each condition code for a calculation result corresponding to the instruction that was executed immediately before. In addition, each flag register 46 in each of the instruction procedure execution units 140, 150, and 160 includes a carry flag for use in holding a carry generated when an addition instruction 'ADC' is executed with a carry taken into account.

There are two formats for each instruction depending on the number of operands. The format of the instruction having three operands is represented by a condition code, an instruction mnemonic, a destination operand, a source operand 1, and a source operand 2. The format of the instruction having two operands is represented by a condition code, an instruction mnemonic, a destination operand, and a source operand 1.

Described below is the operations of the packet processor 100 performed when a series of instruction procedures shown in FIG. 6 are executed. Before performing a packet process in which a checksum of a packet header is computed, a series of instruction procedures (for example, 11 instruction procedures corresponding to the serial number 1 to 11 in the case of the instruction procedure execution unit 140) shown in FIG. 6 are sequentially input to the control unit 42, and the instruction decoder 40 performs the decoding process on each instruction procedure. The results of the decoding process are held in the control unit 42, and a calculation is performed by the arithmetic unit 141 corresponding to one instruction procedure for each clock.

When the packet routing device 200 receives a packet and the bit alignment matching transmitter 220 inputs a packet arrival signal to the packet processor 100 constituting the packet processing device 100A, the selection signal generation unit 130 outputs an individual selection signal to the instruction procedure execution unit 140. Then, the computation of the checksum of the packet header is started by the arithmetic unit 141 in the instruction procedure execution unit 140. At this timing, the leading data (the leading 32-bit data a0) of the received packet is stored in the register p23 at the first stage of the packet access unit 110.

Order 1 (Serial Number 1)

First, in order 1, the arithmetic unit 141 transfers the contents of the register p23 at the first stage in the packet access unit 110 storing the leading data of the packet header to the general-purpose register r0 contained in the built-in general-purpose register group 142.

Order 2 (Serial Number 2)

The arithmetic unit 141 adds up the contents of the register p23 and the general-purpose register r0 in synchronization with the next clock signal, and stores the addition result in the general-purpose register r0. At this time, the leading data of a packet stored in the register p23 is transferred to the register p22 at the next stage in the above mentioned order 1 in synchronization with the clock signal immediately before, and the register p23 at the first stage newly stores the next data of the IP header. That is, in the adding process performed in the order 2, the leading one word data of the packet and the next one word data are added up, and the result is stored in the general-purpose register r0.

Order 3 (Serial Number 3) Through Order 5 (Serial Number 5)

Similarly, the adding processes in orders 3 through 5 are repeated, and the data from the beginning to the fifth word of the packet are added up.

Order 6 (Serial Number 6)

Next, the arithmetic unit 141 adds up the immediate value 0, the contents of the general-purpose register r0, and the carry generated in the adding process of the order 5 immediately before, and the addition result is stored in the general-purpose register r0. An immediate value refers to a value itself, but does not refer to each general-purpose register in the general-purpose register group 142 or each register in the packet access unit 110. In FIG. 6, it is represented by '$'. That is, $0 refers to the value of '0' specified as an immediate value. $16 refers to the value of '16' specified as an immediate value.

In the adding process performed in orders 2 through 6, an adding process is performed with a carry taken into account on the data of each word constituting a packet header. The addition result is stored in the general-purpose register r0.

Order 7 (Serial Number 7)

The arithmetic unit 141 performs the process of transferring the contents of the general-purpose register r0 to the general-purpose register r1.

Order 8 (Serial Number 8)

The arithmetic unit 141 shifts the data of the general-purpose register r0 16 bits to the right (toward the lower bit side), obtains the data filled with '0' in the empty higher bits, and performs the process of storing the result in the general-purpose register r0. In the processes in the order 8 and the previous order 7, the higher 16 bits and the lower 16 bits of the 32 bit data obtained in the adding process up to the order 6 are stored respectively in the general-purpose registers r0 and r1.

Order 9 (Serial Number 9)

The arithmetic unit 141 adds up the contents of the general-purpose register r0 and the contents of the general-purpose register r1 in half-word units (16 bits according to this embodiment), and the addition result is stored in the general-purpose register r0.

Order 10 (Serial Number 10) The arithmetic unit 141 inverts the data stored in the general-purpose register r0 in half-word units, and the result is stored in the general-purpose register r0. In this process, the operation for obtaining the complement on 1 is performed on the contents of the general-purpose register r0.

Order 11 (Serial Number 11)

Since the condition code is '≠', the arithmetic unit 141 performs the process of storing the immediate value of 1 ($1) in the register e13 in the intermediate data transfer unit 120 when the process result in the order 10 is not 0. If the process result in the order 10 is 0, the arithmetic unit 141 does not perform the process of storing the immediate value of 1 in the register e13.

In parallel with the operation of performing the instruction procedure in each of the orders 1 through 11, the packet data input to the packet access unit 110 is shifted in order of the register p23, p22, . . . Therefore, at the timing of performing the instruction procedure in the order 11, the leading packet data in the packet to be computed for the checksum of the packet header is stored in the register p13.

In synchronization with the next clock signal, the packet processor 100 shifts the contents of the register e13 in the intermediate data transfer unit 120 to the register e12, and shifts the leading packet data stored in the register p13 in the packet access unit 110 to the register p12. Thus, in synchronization with the operation of shifting the packet data among the registers in the packet access unit 110, the operations of shifting the checksum computation result among the registers in the intermediate data transfer unit 120 are performed. At the timing of outputting the packet data from the packet processor 100, the computation result of the checksum of the packet header can be externally transmitted as the information pertaining to the packet data.

According to this embodiment, since the minimum packet interval is a 10 clock interval, the checksum computation cannot be completed on the first packet by the instruction procedure execution unit 140 before the next packet arrives at the packet routing device 200 if packets are consecutively received. However, according to this embodiment, the checksum computation of the packet header on the second received packet is performed by the instruction procedure execution unit 150. Therefore, the checksum computation of the packet header on two received packets is performed in parallel. For example, as shown in FIG. 6, when the instruction procedure execution unit 140 performs the process in the order 11 on the serial number 11, the instruction procedure execution unit 150 performs the process in the order 1.

Similarly, before the checksum computation on the second received packet is not completed by the instruction procedure execution unit 150, the third packet can arrive at the packet routing device 200. In this case, for example, as shown in FIG. 6, when the process in the order 11 is performed corresponding to the serial number 21 by the instruction procedure execution unit 150, the instruction procedure execution unit 160 performs the process in the order 1.

Thus, the packet processor 100 according to this embodiment selectively and cyclically performs a predetermined packet process on a received packet using the three instruction procedure execution units 140, 150, and 160 having ten executable instruction procedures corresponding to the minimum packet interval. Therefore, the number of executable steps in each of the instruction procedure execution units 140, 150, and 160 can be tripled into 30 steps. As a result, a packet process having an instruction procedure independent of a packet reception interval can be performed, thereby performing a complicated packet process.

The packet processor 100 according to this embodiment includes the packet access unit 120 for reading and writing data by each instruction procedure execution unit with packet data sequentially shifted, thereby reducing the overhead generated while data is being read and written between a packet processor and memory during the packet process, and realizing a high-speed packet process.

Second Embodiment

FIG. 7 shows a schematic configuration of the packet processing device according to a second embodiment.

The packet processing device according to this embodiment shown in FIG. 7 comprises a plurality of (6, for example) serially connected packet processors 100. Each of the packet processors 100 has the configuration shown in FIG. 4.

According to the packet processing device of this embodiment, the packet access units 110 contained in the six packet processors 100 are serially connected. Thus, the packet data input from the bit alignment matching transmitter 220 sequentially moves in the registers p0 through p23 in the packet access unit 110 at each stage, and is output from the register p0 in the packet access unit 110 at the final stage (sixth stage) to the outside of the packet processing device.

Similarly, the intermediate data transfer units 120 contained in each of the 6 packet processors 100 are serially connected, and the intermediate data input from the bit alignment matching transmitter 220 is sequentially moved in the registers e0 through e23 in the intermediate data transfer unit 120 at each stage, and is output from the register e0 in the intermediate data transfer unit 120 at the final stage to the outside of the packet processing device.

These 6 packet processors 100 are formed by a single integrated circuit, and they are connected through intra-chip wiring. Therefore, the packet data and the intermediate data output from the packet processor 100 at the previous stage can be fetched to the packet access unit 110 and the intermediate data transfer unit 120 in the packet processor 100 at the next stage in synchronization with the rise of the next clock signal.

Thus, by serially connecting m packet processors 100, the number of instruction procedures in the packet process performed on one packet can be multiplied by m. Especially, as described above in the explanation of the first embodiment, the number of instruction procedures of a packet process can be increased by increasing the number of the instruction procedure execution units in one packet processor. However, when the number of instruction procedure execution unit is too large, the wiring between each of the instruction procedure execution units and the packet access unit 110 or the intermediate data transfer unit 120 becomes too complicated, the circuit delay time is prolonged, thereby preventing one instruction from being executed within 1 clock. In this case, the number of the instruction procedure execution units is set equal to or smaller than an allowable value, and the plurality of packet processors 100 are serially connected, thereby desirably increasing the number of instruction procedures of a packet process. Thus, one instruction can be executed in 1 clock with the circuit delay time set equal to or smaller than a predetermined value, and the number of necessary instruction procedures for a complicated packet process can be reserved.

The present invention is not limited to the above mentioned embodiments, but variations of embodiments can be realized within the scope of the gist of the present invention. For example, according to the above mentioned embodiment, the packet processing device 100A used in the packet routing device 200 is described, but the present invention can be applied to the packet processing device used in other communications devices.

Furthermore, according to the above mentioned embodiment, a predetermined packet process is performed on a received IP packet, but the packet process can be performed on the packets other than the IP packet.

In addition, according to the above mentioned embodiment, in each of the packet access unit 110 and the intermediate data transfer unit 120 in the packet processor 100, externally input packet data and intermediate data are input to the register at the first stage, and the data output from the register at the final stage is output externally from the packet processor 100. However, the data externally input to a register at the intermediate stage of each of the packet access unit 110 and the intermediate data transfer unit 120 can be directly stored, or the data stored in a register at the intermediate stage can be directly fetched to an external unit.

Figure 8:
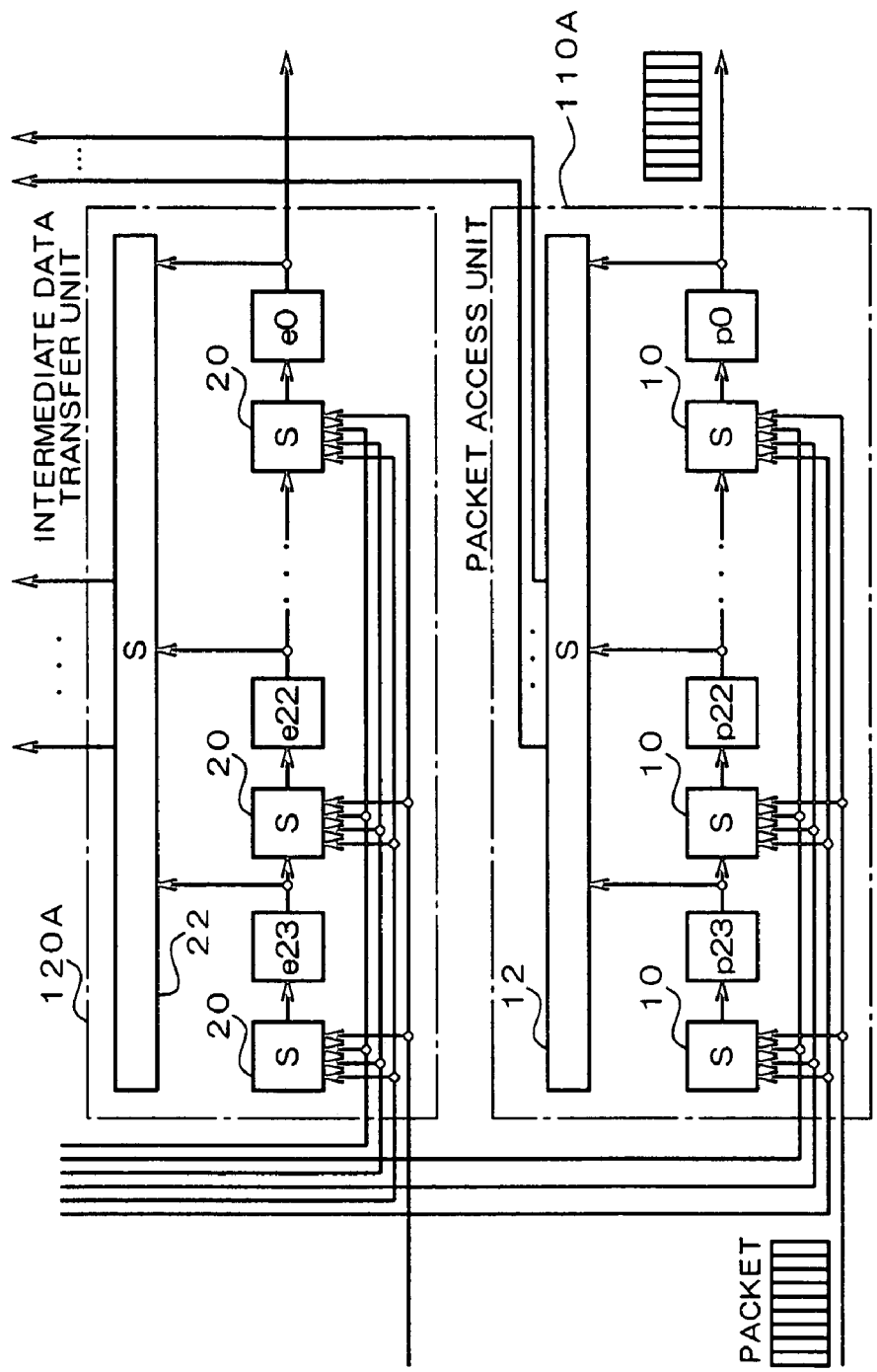
FIG. 8 shows an example of a variation of the packet access unit and the intermediate data transfer unit included in the packet processor.

FIG. 8 shows an example of a variation of the packet process unit and an intermediate data transfer unit contained in the packet processor. The packet access unit 110A shown in FIG. 8 is different from the packet access unit 110 shown in FIG. 4 in that the position at which packet data is externally input can be variable. Practically, in the packet access unit 110A, packet data is input from outside the packet processor 100 to the selector (S) 10 provided at the stage before each of the registers p0 through p23, and the packet data can be directly input to the register connected at the stage after the selector 10 by selecting the externally input packet data by any of the selectors 10. Similarly, in the intermediate data transfer unit 120A, intermediate data is input from outside the packet processor 100 to the selector (S) 20 provided at the stage before each of the registers e0 through e23, and the intermediate data can be directly input to the register connected at the stage after the selector 20 by selecting the externally input intermediate data by any of the selectors 20. Each selector 10 in the packet access unit 110A or each selector 20 in the intermediate data transfer unit 120A corresponds to the write location setting unit.

Therefore, when a calculation is completed with the small number of steps as in the checksum computation of the IP header shown in FIG. 6, packet data and intermediate data are input to the register at the intermediate stage of the packet access unit 110A and the intermediate data transfer unit 120A, thereby shortening the time (time lag) from input to the packet access unit 110A and the intermediate data transfer unit 120A to output of the various data.

Figure 9:
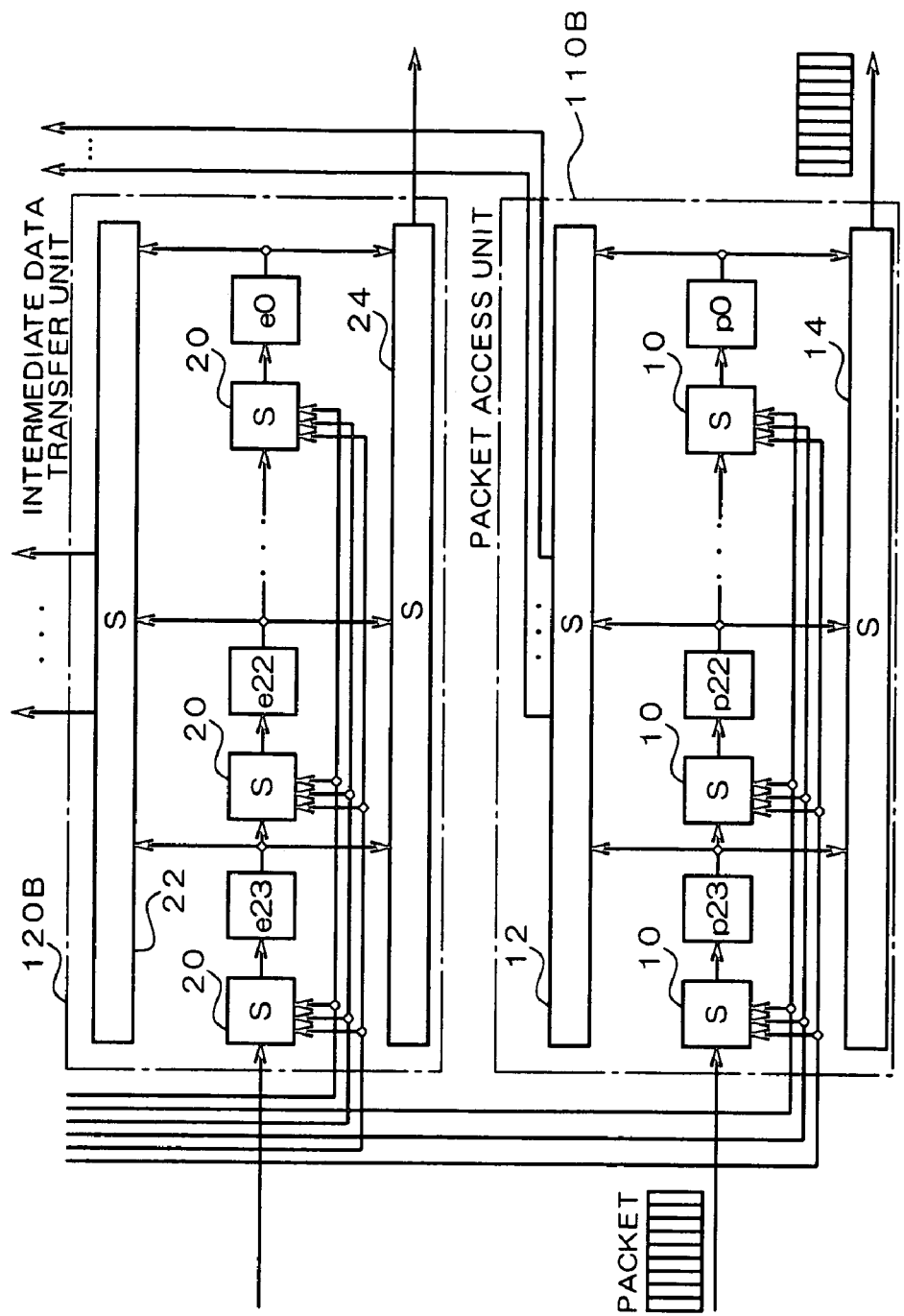
FIG. 9 shows another example of a variation of the packet access unit and the intermediate data transfer unit included in the packet processor.
Figure 10:
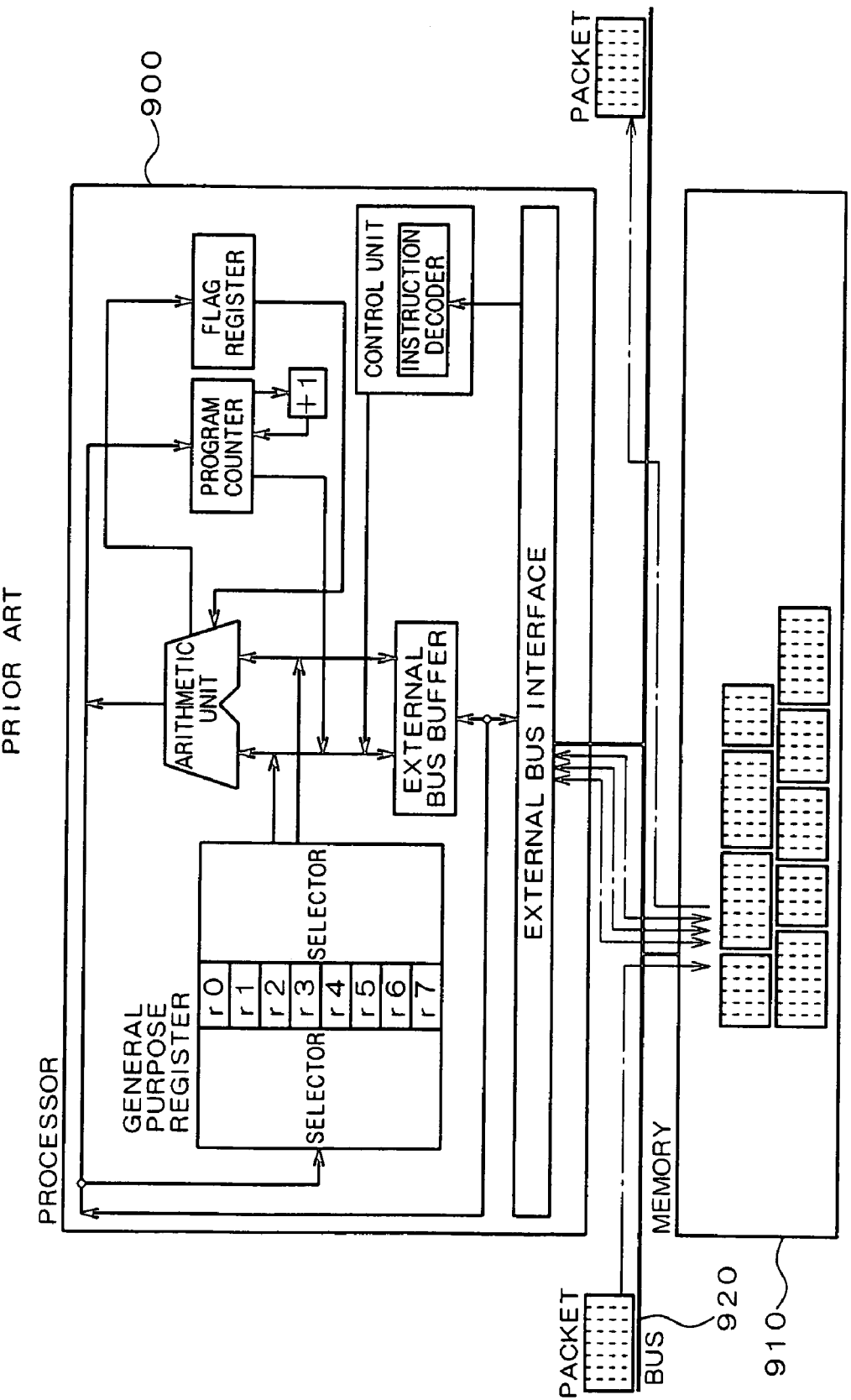
FIG. 10 shows the configuration of the conventional packet processing device.

FIG. 9 shows another example of a variation of the packet process unit and an intermediate data transfer unit contained in the packet processor. The packet access unit 110B shown in FIG. 9 is different from the packet access unit 110 shown in FIG. 4 in that the data stored in each of the registers p0 through p23 can be directly fetched. Practically, in the packet access unit 110B, the data output from each of the registers p0 through p23 is input to each selector (S) 10 at the subsequent stage, and the data is also input to a selector 14. The selector 14 selects a register for fetching packet data outside the packet processor, and the packet data stored in the selected register is output through the selector 14 without using each register at the subsequent stage. Similarly, in the intermediate data transfer unit 120B, the data output from each of the registers e0 through e23 is input to each selector (S) 20 at the subsequent stage, and the data is also input to a selector 24. The selector 24 selects a register for fetching intermediate data outside the packet processor, and the intermediate data stored in the selected register is output through the selector 24 without using each register at the subsequent stage. The selector 14 in the packet access unit 110B or the selector 24 in the intermediate data transfer unit 120B corresponds to the read location setting unit.

Therefore, when a calculation is completed with the small number of steps as in the checksum computation of the IP header shown in FIG. 6, packet data and intermediate data are retrieved from the register at the intermediate stage of the packet access unit 110B and the intermediate data transfer unit 120B, thereby shortening the time from input to the packet access unit 110B and the intermediate data transfer unit 120B to output of the various data.

In addition, according to the above mentioned embodiment, the intermediate data transfer unit 120 is provided in the packet processor 100. However, if a packet process in which it is not necessary to output intermediate data, etc. is performed, the intermediate data transfer unit 120 can be omitted. For example, when the process of subtracting 1 from the value of 'Time to Live' contained in the packet header is performed, the value of 'Time to Live' contained in the input packet data is read, 1 is subtracted from the read value, and the subtraction result is written to the area of 'Time to Live'. Since the intermediate data corresponding to the process result is not necessary, the intermediate data transfer unit 120 can be omitted when the packet process is performed.

What is claimed is:

1. A packet processing device having a packet processor for performing a predetermined packet process by executing an instruction, said packet processor comprising:
    a packet access unit comprising a plurality of first registers, moving received packet data into said first registers sequentially from the beginning and moving the moved packet data among said first registers and transmitting the moved packet data;
    a plurality of instruction procedure execution units, every instruction procedure execution unit having the same configuration as each other, for performing in parallel a predetermined calculation corresponding to each of a plurality of packets according to the packet data held in said first registers in said packet access unit;
    a selection signal generation unit for generating a selection signal for selecting one of said instruction procedure execution units for performing the calculation corresponding to each of the packets in synchronization with a timing of receiving each packet; and
    an intermediate data transfer unit comprising a plurality of second registers, moving intermediate data obtained as a process result from one of said instruction procedure execution units corresponding to the packet data into said second registers to transfer the moved intermediate data in synchronization with the moving of the packet data and in parallel using said first registers in said packet access unit.

2. The packet processing device according to claim 1, wherein
    said intermediate data transfer unit comprises:
    a third selector for executing an operation in parallel for each of said plurality of instruction procedure execution units that selectively fetch the intermediate data held in one or more of said plurality of second registers, and inputting the data to one of said plurality of instruction procedure execution units; and
    a fourth selector for executing an operation in parallel for each of said plurality of instruction procedure execution units that inputs the intermediate data obtained by one of said plurality of instruction procedure execution units executing a specified instruction procedure to one of said plurality of second registers corresponding to an execution order of the instruction procedure.

3. The packet processing device according to claim 1, said second registers further comprising:
    a write location setting unit for variably setting a location at which externally input data is to be written.

4. The packet processing device according to claim 1, said second registers further comprising:
    a read location setting unit for variably setting a location at which externally output data is to be read.

5. A packet processing device having a packet processor for performing a predetermined packet process by executing an instruction, said packet processor comprising:
    a packet access unit comprising a plurality of first registers, moving received packet data into said first registers sequentially from the beginning and moving the moved packet data among said first registers and transmitting the moved packet data;
    a plurality of instruction procedure execution units, every instruction procedure execution unit having the same configuration as each other, for performing in parallel a predetermined calculation corresponding to each of a plurality of packets according to the packet data held in said first registers in said packet access unit; and
    a selection signal generation unit for generating a selection signal for selecting one of said instruction procedure execution units for performing the calculation corresponding to each of the packets in synchronization with a timing of receiving each packet,
    wherein said packet access unit comprises:
        a first selector for executing an operation in parallel for each of said plurality of instruction procedure execution units that selectively fetch the packet data held in one or more of said plurality of first registers, and inputting the data to one of said plurality of instruction procedure execution units; and
        a second selector for executing an operation in parallel for each of said plurality of instruction procedure execution units that inputs resultant data obtained by one of said plurality of instruction procedure execution units executing a specified instruction procedure to one of said plurality of first registers corresponding to an execution order of the instruction procedure.

6. The packet processing device according to claim 5, said first registers further comprising:
    a write location setting unit for variably setting a location at which externally input data is to be written.

7. The packet processing device according to claim 5, said first registers further comprising:
    a read location setting unit for variably setting a location at which externally output data is to be read.

8. The packet processing device according to claim 5, including a plurality of serially connected packet processors.

9. A packet processing device having a packet processor for performing a predetermined packet process by executing an instruction, said packet processor comprising:
    a packet access unit comprising a plurality of first registers, moving received packet data into said first registers sequentially from the beginning and moving the moved packet data among said first registers and transmitting the moved packet data;

a plurality of instruction procedure execution units, every instruction procedure execution unit having the same configuration as each other, for performing in parallel a predetermined calculation corresponding to each of a plurality of packets according to the packet data held in said first registers in said packet access unit; and a selection signal generation unit for generating a selection signal for selecting one of said instruction procedure execution units for performing the calculation corresponding to each of the packets in synchronization with a timing of receiving each packet, wherein each of said plurality of instruction procedure execution units comprises:

a control unit for sequentially decoding a plurality of instruction procedures;

an arithmetic unit for performing a predetermined calculation process corresponding to a result of the decoding by said control unit; and a general-purpose register group comprising a plurality of general-purpose registers functioning as work areas for said arithmetic unit, and a number of the plurality of the instruction procedures prepared for performing a process corresponding to each of the packets is set to a value corresponding to a time longer than a shortest reception interval between two of the packets.

10. The packet processing device according to claim 9, said first registers further comprising:

a write location setting unit for variably setting a location at which externally input data is to be written.

11. The packet processing device according to claim 9, said first registers further comprising:

a read location setting unit for variably setting a location at which externally output data is to be read.

12. The packet processing device according to claim 9, including a plurality of serially connected packet processors.

13. A packet processing device having a packet processor for performing a predetermined packet process by executing an instruction, said packet processor comprising:

a packet access unit comprising a plurality of first registers, moving received packet data including a packet header into said first registers sequentially from the beginning and moving the moved packet data among said first registers and transmitting the moved packet data;

a plurality of instruction procedure execution units, every instruction procedure execution unit having the same configuration as each other, for performing in parallel a predetermined calculation corresponding to each of a plurality of packets according to the packet data held in said first registers in said packet access unit; and a selection signal generation unit for generating a selection signal for selecting one of said instruction procedure execution units for performing the calculation corresponding to each of the said packets in synchronization with a timing of receiving each packet, wherein said packet access unit comprises:

a first selector for executing an operation in parallel for each of said plurality of instruction procedure execution units that selectively fetch the packet data held in one or more of said plurality of first registers, and inputting the data to one of said plurality of instruction procedure execution units; and a second selector for executing an operation in parallel for each of said plurality of instruction procedure execution units that inputs resultant data obtained by one of said plurality of instruction procedure execution units executing a specified instruction procedure to one of said plurality of first registers corresponding to an execution order of the instruction procedure.

14. A packet processing device having a packet processor for performing a predetermined packet process by executing an instruction, said packet processor comprising:

a packet access unit comprising a plurality of first registers, moving, received packet data including a packet header into said first registers sequentially from the beginning and moving the moved packet data among said first registers and transmitting the moved packet data;

a plurality of instruction procedure execution units, every instruction procedure execution unit having the same configuration as each other, for performing in parallel a predetermined calculation corresponding to each of a plurality of packets according to the packet data held in said first registers in said packet access unit; and a selection signal generation unit for generating a selection signal for selecting one of said instruction procedure execution units for performing the calculation corresponding to each of the said packets in synchronization with a timing of receiving each packet, wherein each of said plurality of instruction procedure execution units comprises:

a control unit for sequentially decoding a plurality of instruction procedures;

an arithmetic unit for performing a predetermined calculation process corresponding to a result of the decoding by said control unit; and a general-purpose register group comprising a plurality of general-purpose registers functioning as work areas for said arithmetic unit, and a number of the plurality of the instruction procedures prepared for performing a process corresponding to each of the packets is set to a value corresponding to a time longer than a shortest reception interval between two of the packets.

* * * * *